May 8, 1928.  
D. C. JOHNSON  
1,668,565  
HYDRAULIC PINION, GEAR AND WHEEL PULLER  
Filed May 20, 1927
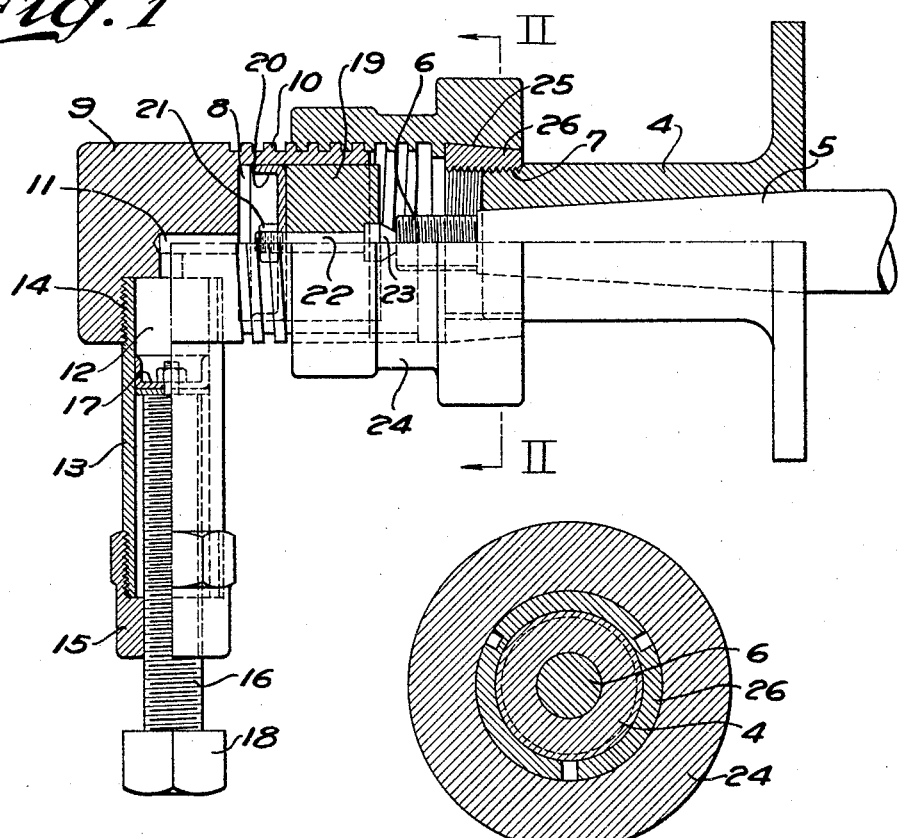
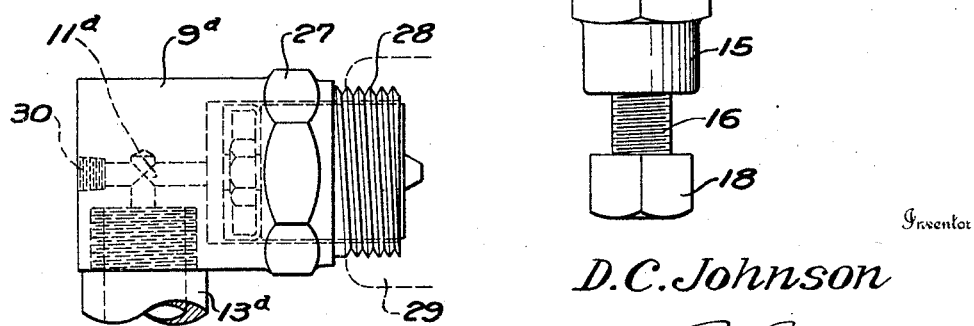
Inventor  
D. C. Johnson Patented May 8, 1928.

1,668,565

UNITED STATES PATENT OFFICE.

DAVID CLEVELAND JOHNSON, OF CARBON HILL, ALABAMA.

HYDRAULIC PINION, GEAR, AND WHEEL PULLER.

Application filed May 20, 1927. Serial No. 193,036.

My invention relates to a hydraulic puller for pinions, gears and wheels, which is simple in its structure, is capable of exerting very great pressure in its pulling action, which is readily adapted to engage pinions, gears or wheels for pulling same from their supports, and which is characterized by the utilization of a screw plunger so disposed with relation to the main plunger cylinder that it will readily serve as a crank for coupling and uncoupling the latter to and from the work.

More particularly, my invention consists in the combination of a compression screw cylinder attached at right angles to the long axis of a main plunger cylinder which is externally threaded so as to be adapted to screw either into the threaded bore of an element to be pulled or into a sleeve carrying clamp elements adapted to surround and engage the element to be pulled, thereby adapting the appliance for pulling various devices that require either internal or external connection with the pulling appliance.

My invention further comprises the novel details of construction and arrangements of parts, which, in their preferred embodiment only, are illustrated in the accompanying drawings which form a part of this specification, and in which:—

Fig. 1 is a view partly in side elevation and partly in vertical cross-section of the two working cylinders and their plungers, this figure showing the device associated with a clamp sleeve.

Fig. 2 is a cross-sectional view taken on the line 2—2 of Fig. 1.

Fig. 3 is a fragmental view showing in elevation a modification of the main cylinder block.

Similar reference numerals refer to similar parts throughout the drawings.

I have illustrated my invention in Fig. 1 as applied to pulling a wheel hub 4 from an axle 5 which has the usual reduced threaded end 6, while the hub itself has a threaded end 7. Obviously this is typical of any work to which the appliance is adapted. The puller appliance as here shown comprises a main plunger cylinder 8 formed in a cylinder block 9 provided with exterior threads 10, the cylinder having at its inner end a port 11 communicating with a cylinder 12 formed in a pipe or tubing 13 which is screwed into a threaded seat 14 in the block 9 with which the port 11 communicates. This cylinder is closed at its outer end and by a nut 15 through which a screw 16 is threaded and carries a cup washer 17 on its inner end and a head 18 on its outer end, whereby the screw can be forced inwardly in the cylinder 12 to drive fluid therefrom through the port 11 into the cylinder 8. The work plunger 19 in the cylinder 8 is provided with a cup washer 20, the latter being held in place by a nut 21 on one end of a bolt 22 which projects axially through the plunger 19 and has a head 23 adapted to engage the work. As shown in Fig. 1, this head 23 engages centrally against the threaded end 6 of the axle. An internally threaded sleeve 24 is screwed on the threaded end of the cylinder block 9 and at its outer end has a taper seat 25 which receives a split taper nut 26, which in turn is internally threaded so as to screw into the threaded end 7 of the wheel.

It is to be understood that the taper nut 26 is an interchangeable element whereby its internal threaded diameter can be varied to suit the work without other change in the pulling appliance.

In the operation of the device as thus far described, having contracted and assembled the desired nut 26 in the tapered seat 25 in the sleeve 24, and having screwed the sleeve on the threaded end 7 of the wheel hub, the cylinder block 9 is in turn screwed into the outer end of the sleeve 24, the cylinder 13 serving as a crank for this purpose until the plunger head 13 engages the axle end 6. Thereupon a suitable tool is applied to the screw head 18 and the plunger 16 is forced inwardly, driving the fluid ahead of it through port 11 into the work cylinder 8 where it acts on the large plunger 19 like a hydraulic jack to bring sufficient pressure to bear on the cylinder head to pull the wheel off of the axle.

In the form of my invention shown in Fig. 3, instead of using the heavy square threads 10 on the cylinder block, as shown in Fig. 1, I form the cylinder block 9ª with a hex shoulder 27 beyond which the end of the block is provided with machine threads 28 that are adapted to be screwed into any suitable work indicated in dotted lines at 29, such for instance as into a sleeve 24 or into a pinion or gear that is internally threaded. In this arrangement the port 11ª is extended through the head of the cylinder block and is closed by an oil filling screw plug 30, and obviously this arrangement may be employed in the design shown in Fig. 1 if it be desired. The operation of this form of my invention is the same as that described after the cylinder block has been screwed into the work. The pipe 13 and screw 16 afford a very convenient handle with powerful leverage for screwing the cylinder block tightly against the work and for readily disengaging it.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. In a pulling device, a main cylinder block having at one end means to connect it to the work, a cylinder in said end having a work plunger adapted to engage the work, and a small compression cylinder connected to the main cylinder and provided with a screw plunger, said cylinders containing fluid which acts responsive to compression of said screw to produce relative axial movement between the cylinder block and work plunger.

2. A pulling device according to claim 1, in which the compression cylinder is disposed at right angles to the cylinder block to serve as a crank, and the cylinder block is threaded and adapted to be screwed and unscrewed by said crank.

3. A pulling device according to claim 1, in which the main cylinder opens with its full diameter through one end of the cylinder block and the work plunger is adapted to project from the open end of its cylinder and engage its work.

4. A pulling device according to claim 1, in which the main cylinder opens with its full diameter through one end of the cylinder block and the work plunger is adapted to project from the open end of its cylinder and engage its work, the plunger having a cup washer at its inner end and a central attaching bolt for the washer provided with a head adapted to contact the work.

5. A pulling device according to claim 1, in which the means to connect the block to its work embody external screw threads on a cylindrical portion of the block.

6. A pulling device according to claim 1, in which the means to connect the block to its work comprise external screw threads on a cylindrical portion of the block, in combination with an internally threaded sleeve carrying means to attach it to the work.

7. A pulling device according to claim 1, in which the means to connect the block to its work comprise external screw threads on a cylindrical portion of the block, in combination with a sleeve internally threaded at one end to screw on the cylinder body and having an internal taper seat at its other end, and a split taper nut mounted on said seat and adapted to screw onto the work.

8. A pulling device comprising a cylinder block internally bored to provide a work cylinder adapted to contain fluid and a plunger adapted to engage the work, a crank sleeve screwed into the cylinder block and bored to form a small cylinder having communication with the work cylinder, a nut screwed onto the sleeve, and a screw in threaded engagement with the nut and adapted to force fluid therefrom onto the work cylinder.

In testimony whereof I affix my signature.

DAVID CLEVELAND JOHNSON.